(12) United States Patent
Wilhelmsson et al.

(10) Patent No.: US 12,710,776 B2
(45) Date of Patent: Aug. 18, 2026

(54) METHOD FOR CONTROLLING PRESSURE RELEASE IN A LIQUID GAS FUEL VOLUME, A LIQUID GAS FUEL VOLUME, AND A VEHICLE COMPRISING THE LIQUID GAS FUEL VOLUME

(71) Applicant: Volvo Truck Corporation, Gothenburg (SE)

(72) Inventors: Martin Wilhelmsson, Gothenburg (SE); Oscar Stjernberg, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 439 days.

(21) Appl. No.: 18/496,038

(22) Filed: Oct. 27, 2023

(65) Prior Publication Data

US 2024/0152166 A1 May 9, 2024

(30) Foreign Application Priority Data

Nov. 7, 2022 (EP) .................................... 22205694

(51) Int. Cl.
*G05D 16/20* (2006.01)

(52) U.S. Cl.
CPC ................................ *G05D 16/2013* (2013.01)

(58) Field of Classification Search
CPC ...... G05D 16/2013; B60K 2015/03585; B60K 15/035
See application file for complete search history.

(56) References Cited

U.S. PATENT DOCUMENTS

2017/0036904 A1* 2/2017 Leone ..................... F02B 43/10
2021/0054969 A1* 2/2021 Scott ...................... B67D 7/302
2022/0219667 A1* 7/2022 Dudar ................ B01D 53/0454
2024/0167633 A1* 5/2024 Wette ...................... F17C 5/007

FOREIGN PATENT DOCUMENTS

DE 102016011862 A1 4/2018

OTHER PUBLICATIONS

Extended European Search Report for European Patent Application No. 22205694.7, mailed May 10, 2023, 6 pages.

* cited by examiner

*Primary Examiner* — Yuhui R Pan
(74) *Attorney, Agent, or Firm* — Withrow & Terranova, PLLC

(57) ABSTRACT

A computer-implemented method for controlling pressure release in a liquid gas fuel volume in a vehicle, the liquid gas fuel volume being arranged with a control unit and a pressure release valve configured to automatically ventilate gas to an external environment when a pressure in the liquid gas fuel volume exceeds a predetermined ventilation set point. The method comprises obtaining by the control unit data, determining by the control unit a refueling pressure set point for the liquid gas fuel volume based on the obtained data, and at a subsequent refueling operation, communicating the refueling pressure set point as a maximum pressure threshold to be used when refueling the liquid gas fuel volume. A control unit to control pressure release according to the method, a computer program, a computer-readable medium, a liquid fuel gas volume arranged with the control unit, and a vehicle comprising the liquid fuel gas volume.

17 Claims, 4 Drawing Sheets

METHOD FOR CONTROLLING PRESSURE RELEASE IN A LIQUID GAS FUEL VOLUME, A LIQUID GAS FUEL VOLUME, AND A VEHICLE COMPRISING THE LIQUID GAS FUEL VOLUME

RELATED APPLICATIONS

The present application claims priority to European Patent Application No. 22205694.7, filed on Nov. 7, 2022, and entitled "METHOD FOR CONTROLLING PRESSURE RELEASE IN A LIQUID GAS FUEL VOLUME, A LIQUID GAS FUEL VOLUME, AND A VEHICLE COMPRISING THE LIQUID GAS FUEL VOLUME," which is incorporated herein by reference in its entirety.

TECHNICAL FIELD

The present disclosure relates to controlling pressure release in a liquid gas fuel volume. More specifically, the present disclosure relates to preventing ventilation of gas from a liquid gas fuel volume.

BACKGROUND

Vehicles driven by liquid natural gas (LNG), or hydrogen-driven vehicles, either equipped with hydrogen fuel cells or with hydrogen-driven combustion engines, have a need for advanced handling of the tank system to store the gas. The gas is typically stored under high pressure and very low temperatures to store large quantities of gas in a relatively low storage volume, such as a liquid gas fuel tank of the vehicle.

For any liquid gas storage, there is a problem with so called boil-off, where the liquid gas on the surface captures heat energy from the surroundings and boils into gas form. When the gas transitions from liquid form to gas form, the pressure in the storage will typically increase since the gas volume expands during the phase shift from liquid to gas.

When the pressure in the storage has become too high, there is typically a pressure release valve available which automatically opens and ventilates the storage until the storage pressure is below acceptable levels again. Activation of the automatic pressure release valve is problematic for transport economy reasons, for gas pollution reasons and/or for safety reasons.

SUMMARY

Therefore, an object of the disclosure is to provide an improved method for controlling pressure release in a liquid gas fuel volume. In particular, an object of the disclosure is to provide a method for avoiding automatic ventilation of gas from the liquid gas fuel volume. Other objects of the disclosure are to provide a liquid gas fuel volume configured for controlling pressure release in the liquid gas fuel volume, and to provide a vehicle comprising such a liquid gas fuel volume.

According to a first aspect of the disclosure, the object is at least partly achieved by a method.

Hence, there is provided a computer-implemented method for controlling pressure release in a liquid gas fuel volume in a vehicle. The liquid gas fuel volume is arranged with a control unit and a pressure release valve configured to automatically ventilate gas to an external environment when a pressure in the liquid gas fuel volume exceeds a predetermined ventilation set point. The method comprises obtaining, by the control unit, data which pertains to historical automatic ventilation events of the liquid gas fuel volume. Determining, by the control unit, a refueling pressure set point for the liquid gas fuel volume based on the obtained data, and at a subsequent refueling operation, communicating the refueling pressure set point as a maximum pressure threshold to be used when refueling the liquid gas fuel volume.

A liquid gas volume is herein defined as a fuel tank or container of a vehicle or vessel using liquid gas as a source of energy, e.g., for propulsion. The liquid gas may be stored in the liquid gas fuel volume under pressure or cooled to the liquid phase temperature. Alternatively, a combination of pressure and temperature may be used to store the liquid gas fuel, so-called cryo-compressed liquid gas. The refueling operation refers to any kind of replenishment of the liquid gas fuel volume, during which operation the refueling pressure is monitored such that refueling operation may be stopped once the refueling pressure set point is reached.

If historical automatic ventilation events are identified, the refueling pressure set point is reduced such that less fuel is filled in a subsequent refueling operation, as compared to a previous refueling operation which preceded the historical automatic ventilation event. Automatic ventilation events may hereby be entirely avoided without necessarily increasing a refueling operation frequency of the vehicle.

As outlined above, the pressure release valve is configured to automatically ventilate gas from the liquid gas fuel volume if the pressure in the volume exceeds the predetermined ventilation set point. By monitoring the pressure release valve by the control unit to obtain data historical automatic ventilation events, the refueling pressure set point to be used for the next refueling operation is set to prevent the pressure in the volume from reaching the predetermined ventilation set point after the refueling operation. Usually, the refueling set point is reduced, as compared to a previous refueling set point. However, it is conceivable that the refueling set point might be increased if no historical automatic ventilation events have been detected for a predetermined period of time.

The control unit is configured to store the obtained data and any determined refueling pressure set points. Determination of the refueling pressure set point may often be calculated from a previous refueling set point which is subsequently modified by the obtained data. Determination of the refueling set point may alternatively be based solely on obtained data. Stored data may for instance be used to statistically determine the refueling pressure set point.

The refueling set point may be set shortly before, or when initializing, a refueling operation.

Optionally, the refueling pressure set point is determined by modifying a previously stored refueling pressure set point by a predetermined amount based on the obtained data.

The refueling pressure set point may be determined by only using the obtained data on historical automatic ventilation events. If an automatic ventilation event is identified since the last refueling operation, the refueling set point is reduced by a predetermined amount. Thereby, after a limited number of refueling operations, the refueling pressure set point will have reached a level which does not result in an automatic ventilation event.

Alternatively, if historical automatic ventilation events have not been identified for a predetermined period of time, the refueling pressure set point may be increased by a predetermined amount. Preferably, an increase of the refueling pressure set point is smaller than a decrease of the refueling pressure set point.

Optionally, the method further comprises determining a volume of gas ventilated from the liquid gas fuel volume during the historical automatic ventilation events.

The volume of gas ventilated from the liquid gas volume may be determined by a sensor unit communicatively connected to the control unit. For instance, the duration of the ventilation event and the size of the opening of the pressure release valve may be determined, along with temperature and pressure of the liquid gas fuel volume, to calculate the amount or volume of ventilated gas.

Optionally, the refueling pressure set point is set based on the determined volume of gas ventilated during the historical automatic ventilation events.

By determining a volume of gas that is ventilated from the liquid gas fuel volume during a historical automatic ventilation event, modification of the refueling pressure set point may be performed with higher accuracy, meaning that the refueled amount of liquid gas may be closer to a maximum volume which does not trigger an automatic ventilation event.

Optionally, determining the volume of gas ventilated from the liquid gas fuel volume is based on ambient measurements, such as ambient temperature and ambient pressure.

Ambient measurements may be performed to determine the volume of ventilated gas. Measurements may be collected by a sensor unit communicatively connected to the control unit. Ambient measurements herein means measurement of temperature and/or pressure outside the liquid gas fuel volume. The use of ambient measurements improves the accuracy when determining the volume of ventilated gas.

Optionally, setting the refueling pressure set point is based on theoretical formulas describing physical relationships relating to volume, pressure and/or temperature of the liquid gas fuel volume and/or its ambient surroundings.

In this manner, the obtained data, including measurements by a sensor unit, may be used to determine the refueling set point by calculations such that an automatic ventilation event may be avoided. Theoretical calculations may further improve the accuracy when setting the refueling pressure set point.

Optionally, the obtained data further pertains to operation of the vehicle and the method comprises analyzing by the control unit the data on the operation of the vehicle and the data on historical automatic ventilation events and determining by the control unit a pattern between the operation of the vehicle and the historical automatic ventilation events prior to determining the refueling pressure set point for the liquid gas fuel volume.

The control unit is configured to obtain and store data relating to operation of the vehicle. Operation of the vehicle may relate to aspects such as which times the vehicle is normally operating, when it is normally refueled, when it is normally standing still. This can for instance be done by collecting statistics on vehicle speed or propulsion power with respect to a time reference. Other obtained data may relate to manner of driving, driven routes, terrain, surrounding traffic, time of operation, time of day, standstill periods, ferry crossings, indoor locations, such as garages and/or tunnels, etc.

The operation of a particular vehicle—especially a commercial vehicle—often shows recurring events, such as in a selection of routes and in a manner of driving. The data may therefore be used by the control unit to learn patterns in operation of the vehicle to be able to predict times of standstill, etc. Times of standstill are particularly important because the liquid gas fuel is usually not consumed to any significant extent by operation of the vehicle. Therefore, standstill means that pressure in the liquid gas fuel volume will increase more quickly than during active operation of the vehicle. As an example, long periods of standstill causing large releases of gas may result in determining, by the control unit, a significantly reduced refueling pressure set point.

By the herein-described procedure there is provided a method which handles the liquid fuel in the liquid gas fuel volume in a way that proactively prevents automatic opening of the pressure release valve. The object is achieved by learning how the vehicle is used over time and identifying when the pressure release valve has historically had to open. Thereafter, the refueling pressure set point is determined to avoid that the pressure in the liquid gas fuel volume reaches the predetermined ventilation set point after the next refueling operation.

Optionally, the setting of the refueling pressure set point is limited to at least a minimum refueling pressure.

The minimum refueling pressure may be used to ensure that the vehicle does not run out of fuel and/or that a refueling frequency of the vehicle does not become inconvenient for the driver or for the operator of the vehicle.

Optionally, the method further comprises communicating the refueling pressure set point to a refueling station.

By communicating the refueling pressure set point to the refueling station, the driver does not need to care about the set refueling pressure set point. The refueling operation may be carried out in a normal manner and may be automatically stopped when the refueling pressure set point is reached.

Optionally, the method further comprises communicating the refueling pressure set point to a driver of the vehicle.

The refueling pressure set point may be communicated to the driver, such as shortly before, or when initializing, a refueling operation. Thereby, the driver does not need to spend time on searching for the determined refueling pressure set point before starting the refueling operation.

According to a second aspect of the present disclosure, the object is at least partly achieved by a control unit.

Hence, there is provided a control unit configured to monitor and control pressure release in a liquid gas fuel volume according to any one of the embodiments of the first aspect of the disclosure.

The control unit may comprise processing capacity in the form of processing circuitry to process the obtained data to determine the refueling pressure set point based on the obtained data.

The control unit may further comprise a communications device for communicating and/or displaying data and/or information.

Optionally, the control unit further comprises a sensor unit, which sensor unit is configured to detect properties of the liquid gas fuel volume.

Such properties may comprise temperature and/or pressure ambient to the liquid gas fuel volume, i.e., outside the liquid gas fuel volume. The properties may also comprise pressure, temperature and volume of liquid fuel gas inside the liquid gas fuel volume. Further properties may comprise measuring gas flow through the pressure release valve during an automatic ventilation event. The sensor unit may be communicatively connected to the control unit for transmitting obtained data to the control unit.

Optionally, the control unit comprises a communications unit which communications unit is configured to communicate the refueling pressure set point.

The communications unit may communicate the refueling pressure to a refueling station and/or to a driver of the vehicle. The communications unit may display the refueling pressure set point to the driver visually, such as via a display on the dashboard, near the liquid gas fuel volume, or on a handheld device. The communications unit may also wirelessly communicate the refueling pressure set point to refueling station. The refueling station may then automatically stop a refueling operation when the refueling pressure set point is reached.

According to a third aspect of the disclosure, the object is at least partly achieved by a computer program product.

Hence there is provided a computer program product comprising program code for performing, when executed by the control unit, the method according to any one of the embodiments of the first aspect of the disclosure.

According to a fourth aspect of the disclosure, the object is at least partly achieved by a non-transitory computer-readable storage medium.

Hence, there is provided a non-transitory computer-readable storage medium comprising instructions, which when executed by the control unit according to the second aspect of the disclosure causes the control unit to perform the method of any one of the embodiments of the first aspect of the disclosure.

The control unit may be connected to the non-transitory computer-readable storage medium having stored thereon the computer program product, which comprises code to cause the control unit to execute any of the method steps of the method of the disclosure. The control unit may use the software/computer program product to control pressure release in the liquid gas fuel volume. The computer program is configured for the control unit to run the method in the most efficient possible manner.

According to a fifth aspect of the disclosure, the object is at least partly achieved by a liquid gas fuel volume.

Hence, there is provided a liquid gas fuel volume arranged with a control unit according to any one of the embodiments of the second aspect of the disclosure. The liquid gas fuel volume is further provided with a pressure release valve configured to be monitored and controlled by the control unit and to automatically ventilate gas to an external environment when a pressure in the liquid gas fuel volume exceeds a predetermined ventilation set point.

According to a sixth aspect of the disclosure, the object is at least partly achieved by a vehicle.

Hence, there is provided a vehicle powered by liquid gas fuel, such as liquid hydrogen or liquid natural gas, the vehicle comprising the liquid gas fuel volume according to the fifth aspect if the disclosure.

BRIEF DESCRIPTION OF THE DRAWINGS

Further objects and advantages of, and features of the disclosure will be apparent from the following description of one or more embodiments, with reference to the appended drawings, where.

DETAILED DESCRIPTION

The present disclosure is developed in more detail below referring to the appended drawings which show examples of embodiments. The disclosure should not be viewed as limited to the described examples of embodiments; instead, it is defined by the appended patent claims. Like numbers refer to like elements throughout the description.

Figure 1:
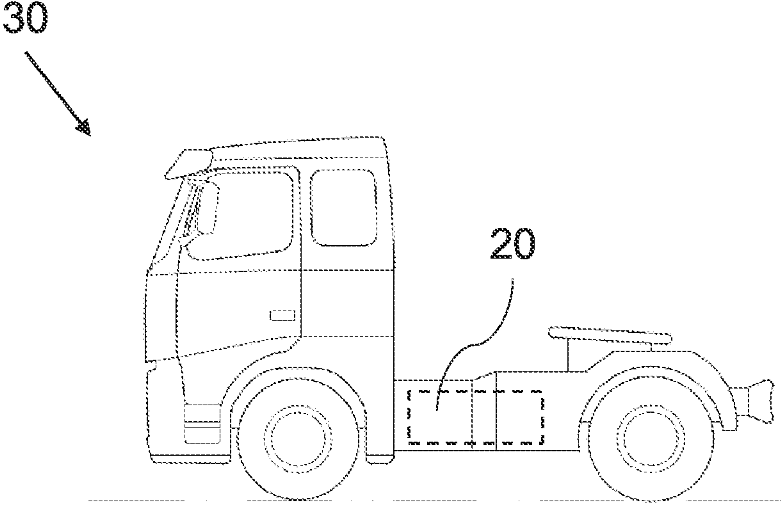
FIG. 1 shows a vehicle according to an aspect of the present disclosure.
Figure 2:
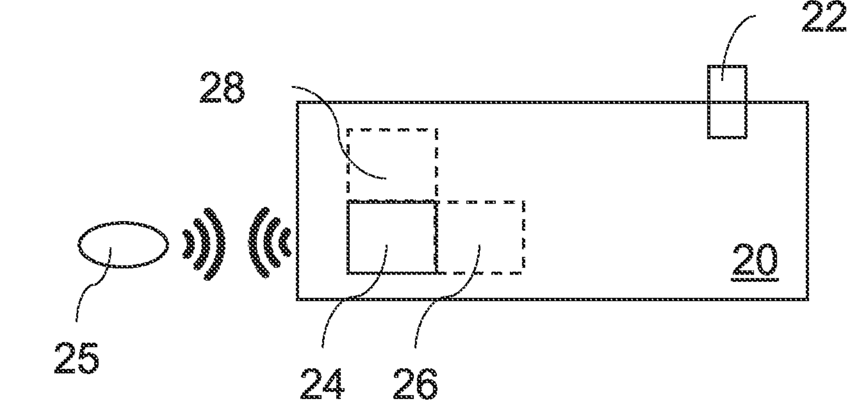
FIG. 2 shows a liquid gas fuel volume according to another aspect of the disclosure.

FIG. 1 shows an example of a vehicle 30 powered by liquid gas fuel, such as liquid hydrogen or liquid natural gas (LNG). The vehicle 30 comprises a liquid gas fuel volume 20, as shown in FIG. 2. As the vehicle 30 is operated and consumes liquid gas fuel, a pressure in the liquid gas fuel volume 20 decreases. However, during standstill pressure may increase due to boil-off, as the surface of the liquid gas absorbs heat from the environment and shifts from liquid phase to gas phase. The liquid gas fuel volume 20 may be arranged with a control unit 24 and a pressure release valve 22. The pressure release valve 22 is configured to automatically ventilate gas to an external environment of the liquid gas fuel volume 20 when a pressure in the liquid gas fuel volume 20 exceeds a predetermined ventilation set point P T. The predetermined ventilation set point P T is set so as to avoid damage to a tank holding the liquid gas fuel volume 20 when pressure increases due to the boil-off phenomenon. The present disclosure aims at reducing, or eliminating, pressure release through the pressure release valve 22 by determining and applying a refueling pressure set point $R_P$. The refueling pressure set point $R_P$ is applied, when refueling the liquid gas fuel volume 20, such that the pressure in the liquid gas fuel volume 20, after a refueling operation, will not exceed the predetermined ventilation set point $P_{during}$ a predicted operation of the vehicle 30.

The control unit 24 may further comprise processing capacity in the form of processing circuitry to process the obtained data to determine the refueling pressure set point $R_P$ based on the obtained data. The control unit 24 may further comprise a communications unit 28 for communicating and/or displaying data and/or information, such as the refueling pressure set point $R_P$. The refueling pressure set point $R_P$ may for instance be communicated to a refueling station or to a driver of the vehicle 30. By communicating the refueling pressure set point $R_P$ to the refueling station 40, the driver does not need to remember the set refueling pressure set point $R_P$. The refueling operation may be carried out in a normal manner and may be automatically stopped when the refueling pressure set point $R_P$ is reached. As stated above, the refueling pressure set point $R_P$ may alternatively be communicated to the driver, such as shortly before, or when initializing, a refueling operation. Thereby, the driver does not need to spend time and effort on searching for the last determined refueling pressure set point $R_P$ before starting the refueling operation.

As exemplified in FIG. 2, the control unit 24 may also comprise a sensor unit 26. The sensor unit 26 may be configured to detect properties of the liquid gas fuel volume 20. The properties may comprise temperature and/or pressure ambient to the liquid gas fuel volume 20, i.e., outside the liquid gas fuel volume 20. The properties may also comprise pressure, temperature and volume of liquid gas fuel inside the liquid gas fuel volume 20. Further properties may comprise measurement of gas flow through the pressure release valve 22 during an automatic ventilation event. The sensor unit 26 may be communicatively connected to the control unit 24, such as to the processing circuitry, for transmitting obtained data to the control unit 24. The sensor unit 26 may comprise a plurality of sensing devices (not shown) which may be distributed throughout the liquid gas fuel volume 20.

Further, the control unit 24 may comprise a communications unit 28. The communications unit 28 may communicate the refueling pressure set point $R_P$ to a refueling station 40 and/or to a driver of the vehicle 30. The communications unit 28 may display the refueling pressure set point $R_P$ to the driver visually, such as via a display on a dashboard in the cab, near the liquid gas fuel volume, or on a handheld device. If the communications unit 28 communicates the refueling pressure set point $R_P$ to a refueling station 40, the refueling station 40 may automatically stop a refueling operation when the refueling pressure set point $R_P$ is reached. The communication of the refueling pressure set point $R_P$ is conceptually illustrated in FIG. 3.

Figure 4:
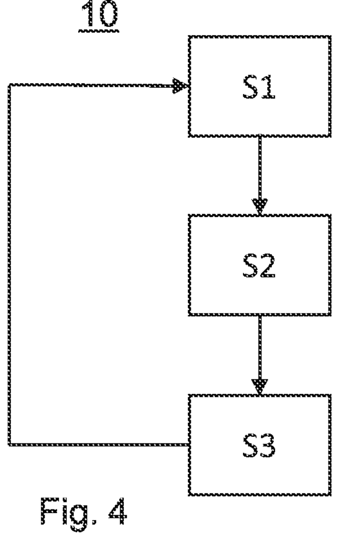
FIG. 4 shows a flowchart of a method according to another aspect of the present disclosure.

FIG. 4 illustrates a flowchart of a method 10 according to an aspect of the present disclosure. In the flowchart, dashed lines indicate an optional step. The method 10 relates to a computer-implemented method 10 for controlling pressure release in the liquid gas fuel volume 20 in the vehicle 30. As outlined above, the liquid gas fuel volume 20 may be arranged with a control unit 24 and a pressure release valve 22 configured to automatically ventilate gas to an external environment when a pressure in the liquid gas fuel volume 20 exceeds a predetermined ventilation set point P T. The method 10 comprises obtaining S1 by the control unit 24 data, which data pertains to historical automatic ventilation events of the liquid gas fuel volume 20. Further, the method comprises determining S2 by the control unit 24 a refueling pressure set point $R_P$ for the liquid gas fuel volume 20 based on the obtained data, and at a subsequent refueling operation R, communicating S3 the refueling pressure set point $R_P$ as a maximum pressure threshold to be used when refueling the liquid gas fuel volume 20. The method may be carried out at regular predetermined time intervals, or at events such as at an automatic ventilation event, or at a refueling operation R event.

If historical automatic ventilation events are identified, the refueling pressure set point $R_P$ is reduced such that less fuel is filled in a subsequent refueling operation R, as compared to a previous refueling operation R which preceded the historical automatic ventilation event. Automatic ventilation events may hereby be entirely avoided without necessarily increasing a refueling operation frequency of the vehicle 30.

As outlined above, the pressure release valve 22 is configured to automatically ventilate gas from the liquid gas fuel volume 20 if the pressure in the volume exceeds the predetermined ventilation set point $P_T$. By monitoring the pressure release valve 22 by the control unit 24 to obtain data on historical automatic ventilation events, the refueling pressure set point $R_P$ to be used for the next refueling operation R is set to prevent the pressure in the liquid gas fuel volume 20 from reaching the predetermined ventilation set point P T after the refueling operation R. Usually, the refueling set point $R_P$ is reduced, as compared to a previous refueling set point that resulted in an automatic ventilation event. However, it is conceivable that the refueling set point $R_P$ might be increased if no historical automatic ventilation events have been detected for a predetermined period of time.

The control unit 24 is configured to store the obtained data and any determined refueling pressure set points $R_P$. Determination of the refueling pressure set point $R_P$ may be calculated from a previous refueling pressure set point which is subsequently modified by the latest obtained data. Determination of the refueling pressure set point $R_P$ may alternatively be based solely on recently obtained data, such as data from a predetermined period of time prior to the setting of the refueling pressure set point $R_P$ without regard to a previously set refueling pressure set point $R_P$.

The refueling pressure set point $R_P$ may be set shortly before, or when initializing, a refueling operation R. Alternatively, the refueling pressure set point $R_P$ may be set at regular intervals, which intervals may be adapted to service cycles of a particular vehicle 30.

As mentioned hereinabove, the refueling pressure set point $R_P$ may be determined by modifying a previously stored refueling pressure set point by a predetermined amount based on the obtained data. Thereby, the refueling pressure set point $R_P$ may be determined by only using the obtained data on historical automatic ventilation events. If an automatic ventilation event is identified since the last refueling operation, the refueling pressure set point $R_P$ is reduced by a predetermined amount. Thereby, after a limited number of refueling operations R, the refueling pressure set point $R_P$ will have reached a level which does not result in an automatic ventilation event. In this embodiment, the refueling pressure set point may be determined at each occurrence of an automatic ventilation event.

Alternatively, if historical automatic ventilation events have not been identified for a predetermined period of time, the refueling pressure set point $R_P$ may be increased by a predetermined amount. Preferably, an increase of the refueling pressure set point $R_P$ is smaller than a previous decrease of the refueling pressure set point $R_P$. By way of example, an increase in the refueling pressure set point $R_P$ may be less than the last decrease if the refueling pressure set point $R_P$.

Figure 5:
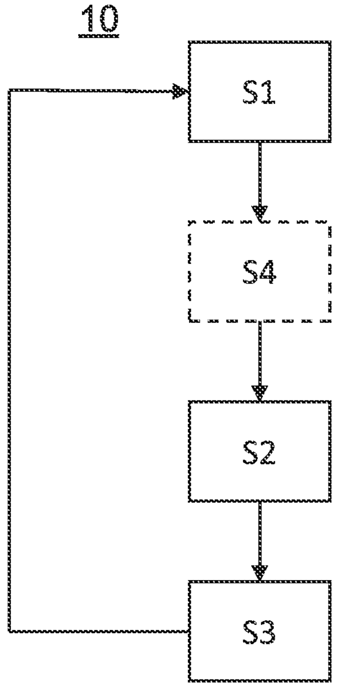
FIG. 5 shows a flowchart of a method according to an alternative embodiment of the present disclosure.

As illustrated in FIG. 5, for improved accuracy in determining S2 the refueling pressure set point $R_P$, the method 10 may comprise determining S4 a volume of gas ventilated from the liquid gas volume 20 during any historical automatic ventilation events. The volume of gas ventilated from the liquid gas volume 20 may be determined by the sensor unit 26 which may be communicatively connected to the control unit 24. For instance, the duration of the ventilation event and the size of the opening of the pressure release valve 22 may be determined, along with temperature and pressure of the liquid gas fuel volume 20, to calculate the amount or volume of ventilated gas.

Determining the volume of gas ventilated from the liquid gas fuel volume 20 may be based on ambient measurements, such as ambient temperature and ambient pressure. Such measurements may be collected by the sensor unit 26 which may be communicatively connected to the control unit 24.

The obtained data, including measurements by the sensor unit 26, may be used to determine the refueling set point $R_P$ by calculations using theoretical formulas describing physical relationships relating to volume, pressure and/or temperature of the liquid gas fuel volume 20 and/or its ambient surroundings, such that an automatic ventilation event may be avoided. The ideal gas law is an example of theoretical formulas that may be used, i.e., PV=nRT, where P is the pressure, V is the volume, n is the amount of substance, R is the ideal gas constant, and is the temperature.

Figure 6:
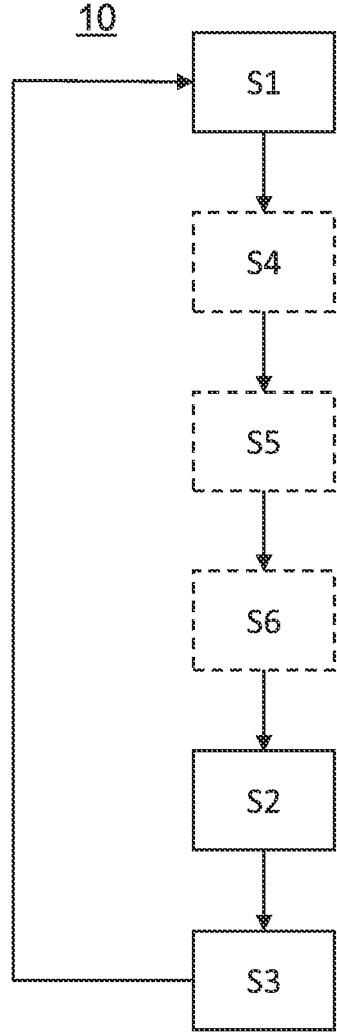
FIG. 6 shows a flowchart of a method according to yet an alternative embodiment of the present disclosure.

According to an embodiment, illustrated in FIG. 6, the obtained data further pertains to operation of the vehicle 30. The method 10 comprises analyzing S5 by the control unit 24 the data on the operation of the vehicle and the data on historical automatic ventilation events and determining S6 by the control unit 24 a pattern between the operation of the vehicle 30 and the historical automatic ventilation events prior to determining S2 the refueling pressure set point $R_P$ for the liquid gas fuel volume (20). Thereby, statistics or machine learning may be used to further improve the accuracy of the refueling pressure set point $R_P$. The step of determining S4 the volume of gas ventilated from the liquid gas fuel volume may optionally be included when analyzing S5 by the control unit 24 the obtained data.

The operation of a particular vehicle 30—especially a commercial vehicle 30—often shows recurring events, such as in selection of routes and in a manner of driving. The obtained data may therefore be used by the control unit 24 to learn patterns in operation of the vehicle 30 to be able to predict times of standstill, etc. Times of standstill are particularly important because the liquid gas fuel is usually not consumed to any significant extent by operation of the vehicle 30. Therefore, standstill means that pressure in the liquid gas fuel volume 20 will increase more quickly than during active operation of the vehicle 30. As an example, long periods of standstill may result in determining S2, by the control unit 24, a significantly reduced refueling pressure set point $R_P$.

There is thus provided a method 10 which handles the liquid fuel in the liquid gas fuel volume 20 in a way that proactively prevents automatic opening of the pressure release valve 22. The object is achieved by learning how the vehicle 30 is used over time and identifying when the pressure release valve 22 has historically had to open. Thereafter, the refueling pressure set point $R_P$ is determined to avoid that the pressure in the liquid gas fuel volume reaches the predetermined ventilation set point P T after the next refueling operation R.

If operation of the vehicle 30 shows that a certain route is serviced repeatedly, the refueling pressure set point $R_P$ may be determined once for each repetition/cycle.

A minimum refueling pressure may be used when refueling to ensure that the vehicle 30 does not run out of fuel and/or that a refueling frequency of the vehicle does not become inconvenient for the driver or for the operator of the vehicle 30.

Figure 7:
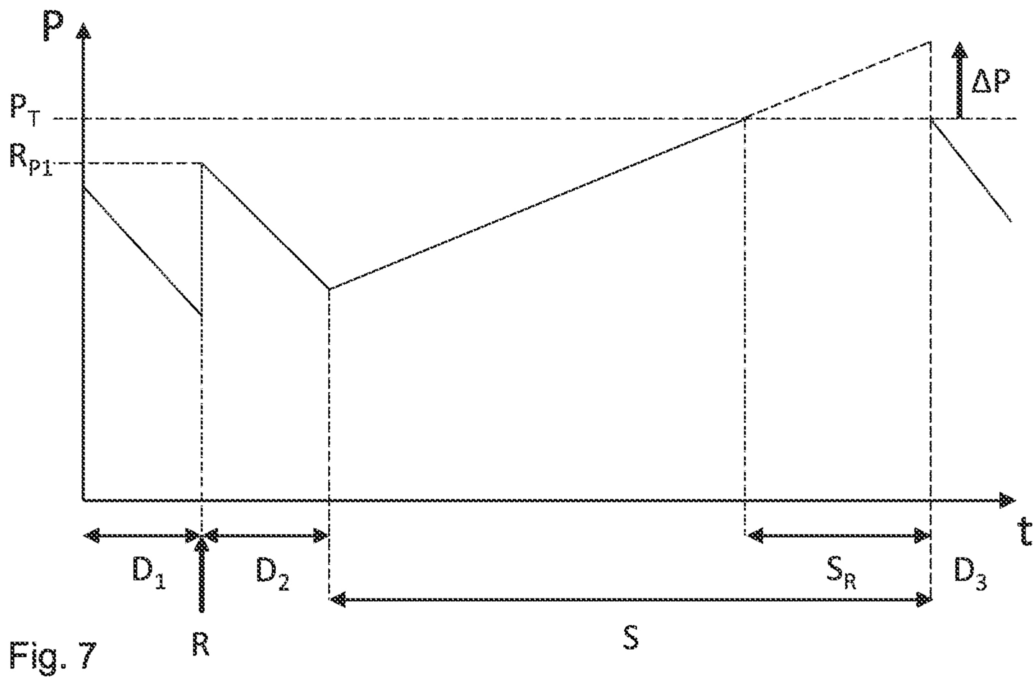
FIG. 7 shows a diagram of pressure variations in a liquid gas fuel volume.

FIG. 7 shows a diagram which illustrates variation in pressure in a liquid gas fuel volume during operation D and standstill S of the vehicle 30. The vertical axis represents the pressure P in the liquid gas fuel volume 20. The horizontal axis represents the time t elapsed. The pressure release valve 22 is configured to automatically open to ventilate gas to an external environment when pressure in the liquid gas fuel volume 20 exceeds the ventilation set point $P_T$.

From left to right in the diagram, the vehicle 30 is first operated $D_1$ for a time during which the pressure in the liquid gas fuel volume 20 decreases until a refueling operation R is carried out to replenish the fuel in the liquid gas fuel volume 20. The refueling operation R increases the pressure to a first refueling pressure set point $R_{P1}$. After the refueling operation, the vehicle 30 is operated $D_2$ for an additional period of time during which the pressure P in the liquid gas fuel volume 20 decreases.

Thereafter, the vehicle 30 enters a standstill mode S. It may for instance be parked overnight. During the standstill mode S, pressure P increases to the predetermined ventilation set point $P_T$, at which point the pressure release valve 22 opens and begins to ventilate S R gas from the liquid gas fuel volume 20. The dashed inclined line in FIG. 7 illustrates a hypothetical pressure increase ΔP which would have occurred if the liquid gas fuel volume 20 had lacked a pressure release valve 22, or if the pressure release valve 22 would not have opened. The hypothetical pressure increase corresponds to a modification of the refueling pressure set point $R_P$, as will be explained below.

After the standstill S, the vehicle 30 is operated $D_3$ again and pressure is reduced from the predetermined ventilation set point level $P_T$.

Figure 8:
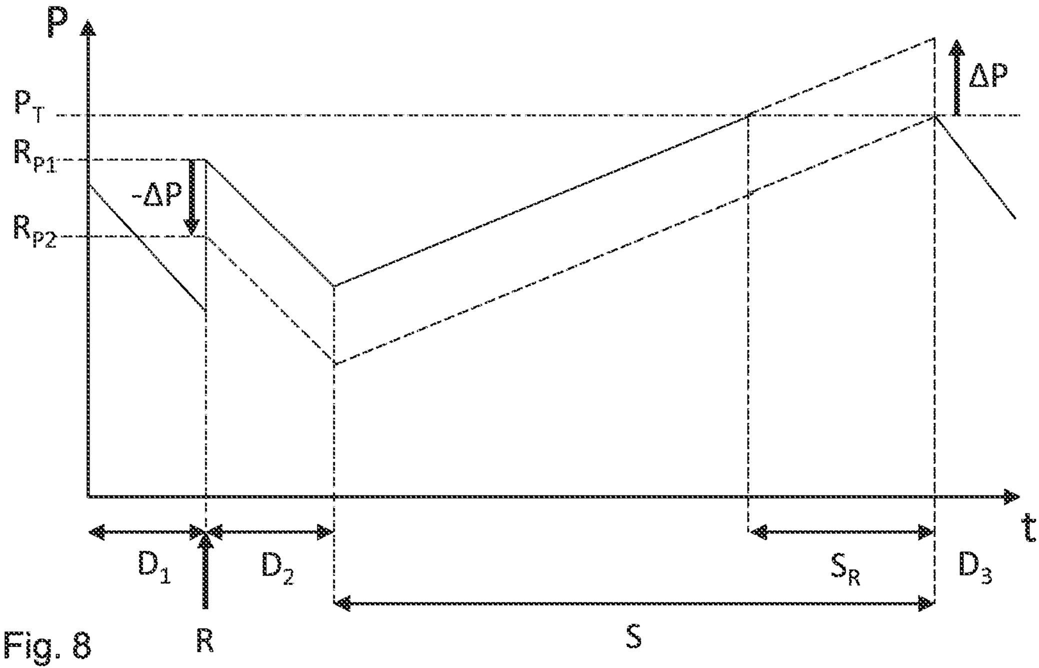
FIG. 8 shows a diagram of applying the method of FIG. 3 for controlling pressure release in the liquid gas fuel volume.

FIG. 8 shows how the hypothetical pressure ΔP of the example of FIG. 7 is used to modify the first refueling pressure set point $R_{P1}$, by an amount—ΔP resulting in an updated refueling pressure set point $R_{P2}$. The hypothetical pressure increase ΔP may correspond to a volume of gas which is released during the ventilation. The released volume may be calculated theoretically, or properties of the release may be detected by the sensor unit 26 and used to calculate the released volume or to calculate an updated refueling pressure set point $R_{P2}$ directly.

Figure 9:
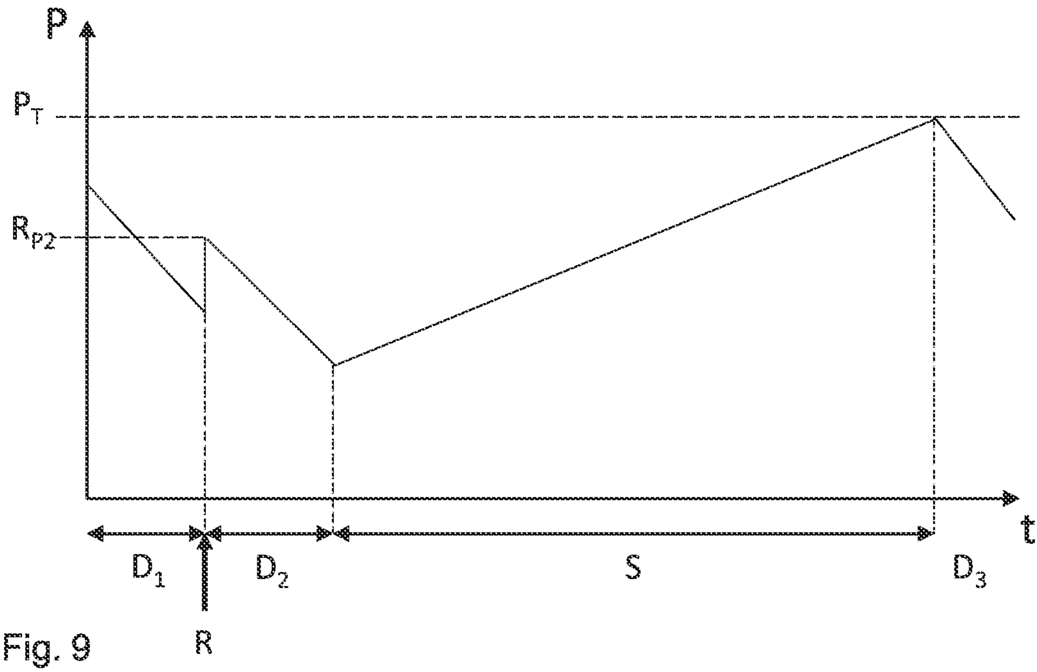
FIG. 9 shows a diagram of pressure variations in a liquid gas fuel volume after applying a method according to an aspect of the present disclosure.

FIG. 9 exemplifies how the vehicle 30 of FIGS. 4 and 5 is used on a similar route. After operation $D_1$, at the time of a refueling operation R, the liquid gas fuel volume is replenished to the new updated refueling pressure set point $R_{P2}$. After further operation $D_2$ and during standstill S, the pressure P in the liquid gas fuel volume 20 does not exceed the predetermined ventilation set point $P_T$, thereby avoiding release of gas to the environment.

According to an aspect of the disclosure, there is also provided a computer program comprising program code to cause the control unit 24 to execute the method 10, and a non-transitory computer-readable storage medium 25, such as a local computer memory device, or a "cloud" storage, having stored thereon the computer program.

Figure 3:
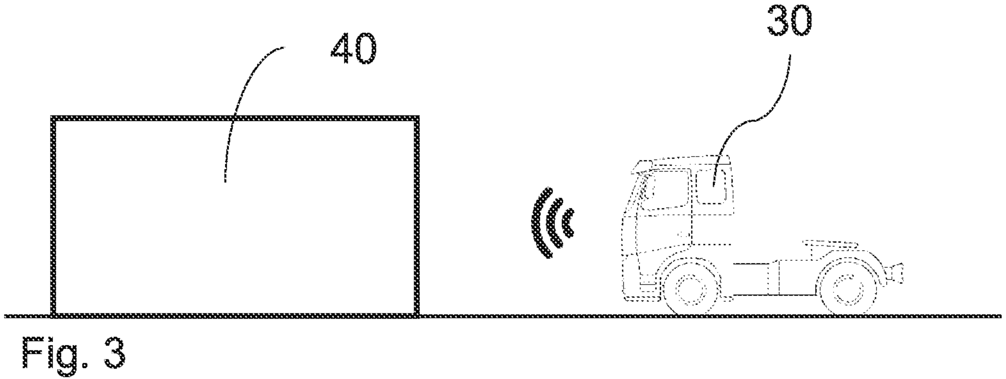
FIG. 3 shows communication between a vehicle according to an aspect of the disclosure and a refueling station.

The control unit 24 may be connected either by wire or wirelessly to the non-transitory computer-readable storage medium 25. FIG. 3 conceptually shows the non-transitory computer-readable storage medium 25 communicating wirelessly with the control unit 24. The control unit 24 may use the software/computer program to control pressure release in the liquid gas fuel volume 20. The computer program is configured for the control unit 24 to run the method in the most efficient possible manner.

The invention claimed is:

1. A computer-implemented method for controlling pressure release in a liquid gas fuel volume in a vehicle, the liquid gas fuel volume being arranged with a control unit and a pressure release valve configured to automatically ventilate gas to an external environment when a pressure in the liquid gas fuel volume exceeds a predetermined ventilation set point, the method comprising:

obtaining, by the control unit, data which pertains to historical automatic ventilation events of the liquid gas fuel volume;

determining, by the control unit, a refueling pressure set point for the liquid gas fuel volume based on the obtained data; and at a subsequent refueling operation, communicating, by the control unit, the refueling pressure set point to be used as a maximum pressure threshold when refueling the liquid gas fuel volume.

2. The method of claim 1, wherein the refueling pressure set point is determined by modifying a previous refueling pressure set point by a predetermined amount based on the obtained data.

3. The method of claim 1, further comprising determining a volume of gas ventilated from the liquid gas fuel volume during historical automatic ventilation events.

4. The method of claim 3, wherein the refueling pressure set point is set based on the determined volume of gas ventilated during historical automatic ventilation events.

5. The method of claim 3, wherein determining the volume of gas ventilated from the liquid gas fuel volume is based on ambient measurements, such as ambient temperature and ambient pressure.

6. The method of claim 3, wherein setting the refueling pressure set point is based on theoretical formulas describing physical relationships relating to volume, pressure, and/or temperature of the liquid gas fuel volume and/or its ambient surroundings.

7. The method of claim 1, wherein the obtained data further pertains to operation of the vehicle and wherein the method further comprises:

analyzing, by the control unit, the data on the operation of the vehicle and the data on historical automatic ventilation events; and determining, by the control unit, a pattern between the operation of the vehicle and the historical automatic ventilation events prior to determining the refueling pressure set point for the liquid gas fuel volume.

8. The method of claim 1, wherein the setting of the refueling pressure set point is limited to at least a minimum refueling pressure.

9. The method of claim 1, further comprising communicating the refueling pressure set point to a refueling station.

10. The method of claim 1, further comprising communicating the refueling pressure set point to a driver of the vehicle.

11. A control unit configured to control pressure release in a liquid gas fuel volume according to the method of claim 1.

12. The control unit of claim 11, further comprising a sensor unit configured to detect properties of the liquid gas fuel volume.

13. The control unit of claim 11, further comprising a communications unit configured to communicate the refueling pressure set point.

14. A computer program product comprising program code for performing the method of claim 1 when executed by the control unit.

15. A non-transitory computer-readable storage medium comprising instructions which, when executed by the control unit of claim 12, causes the control unit to perform a method for controlling pressure release in a liquid gas fuel volume in a vehicle, the liquid gas fuel volume being arranged with a control unit and a pressure release valve configured to automatically ventilate gas to an external environment when a pressure in the liquid gas fuel volume exceeds a predetermined ventilation set point, comprising:

obtaining, by the control unit, data which pertains to historical automatic ventilation events of the liquid gas fuel volume;

determining, by the control unit, a refueling pressure set point for the liquid gas fuel volume based on the obtained data; and at a subsequent refueling operation, communicating, by the control unit, the refueling pressure set point to be used as a maximum pressure threshold when refueling the liquid gas fuel volume.

16. A liquid gas fuel volume arranged with the control unit of claim 11 and a pressure release valve configured to automatically ventilate gas to an external environment when a pressure in the liquid gas fuel volume exceeds a predetermined ventilation set point.

17. A vehicle powered by liquid gas fuel, the vehicle comprising the liquid gas fuel volume of claim 16.

* * * * *